United States Patent [19]

Takahashi

[11] Patent Number: 4,790,757
[45] Date of Patent: Dec. 13, 1988

[54] INSTRUMENT FOR PRACTICING MULTIPLICATION

[75] Inventor: Fumitaka Takahashi, Shizuoka, Japan

[73] Assignee: Kawai Gakki Seisakusho Co, Ltd, Shizuoka, Japan

[21] Appl. No.: 108,648

[22] Filed: Oct. 15, 1987

[30] Foreign Application Priority Data

Oct. 19, 1986 [JP] Japan .................................. 61-274153
Oct. 28, 1986 [JP] Japan .................................. 61-254770

[51] Int. Cl.$^4$ .............................................. G09B 1/00
[52] U.S. Cl. ................................................... 434/209
[58] Field of Search ............... 434/205, 207, 209, 202, 434/191, 195

[56] References Cited

U.S. PATENT DOCUMENTS 3,061,947 11/1962 Faudree ............................. 434/205
3,224,114 12/1965 Swanson ........................... 434/209
3,456,364 7/1969 Alexander ......................... 434/209
4,445,865 5/1984 Sellon ................................ 434/209

Primary Examiner—James C. Yeung
Attorney, Agent, or Firm—Holman & Stern

[57] ABSTRACT

An instrument for practicing multiplication to be used by children, in which there is a base plate, a printed plate fixed on the base plate, a group of horizontal cursors slidably installed on the base plate, a group of vertical cursors placed on top of the horizontal cursors and slidably installed on the base plate, and a top cover grass plate. These element are arranged as to calculate multiplication by sliding some of these two group of the cursors. One group of the cursors are given a sequence of numbers 1 to 9, and the other group of cursors are given the same sequence of numbers 1 to 9. When a number (X) of one group of cursors and a number (Y) of the other group of cursors are slided to one direction, a figure corresponding to the answer of X by Y and a group of marks equal to the answer are displayed on the instrument.

6 Claims, 10 Drawing Sheets

INSTRUMENT FOR PRACTICING MULTIPLICATION

BACKGROUND OF THE INVENTION

This invention relates to an improved instrument intended to help children to learn and to practice multiplication.

The existing means to help children learn multiplication is most likely a multiplication table sheet which shows each question and answer corresponding from 1*1 to 9*9, but this type of instrument is not so attractive for children to practice multiplication.

An object of the invention is to provide an attractive instrument intended to help children to understand value of each number and to practice multiplication.

SUMMARY OF THE INVENTION

This invention provides an instrument which is operated by children themselves to calculate simple multiplication.

One form of the invention is comprised of a square shaped base plate, a printed plate on which are printed marks and figures, vertical cursors with transparent windows slidably installed on said base plate, horizontal cursors with transparent windows also slidably installed on the base plate, and a cover put on top of the instrument, so arranged that by sliding number (X) of vertical cursor(s) and number (Y) of horizontal cursor(s) to one direction, a multiplication of X by Y is calculated, and a figure corresponding to the answer to the multiplication appeares on the instrument, and marks equal to the answer appears through the windows. So it helps children to understand the logic of multiplication and the value of a figure at the same time.

Another form of the invention is provided by same number of elements as the above mentioned form. In this form, dot marks are printed on one group of the cursors instead of the printed plate. Same multiplication to a question is calculated on the instrument and a figure to the answer of the question and marks equal to the answer are displayed on the instrument.

DESCRIPTION OF PREFERRED EMBODIMENTS

Figure 1:
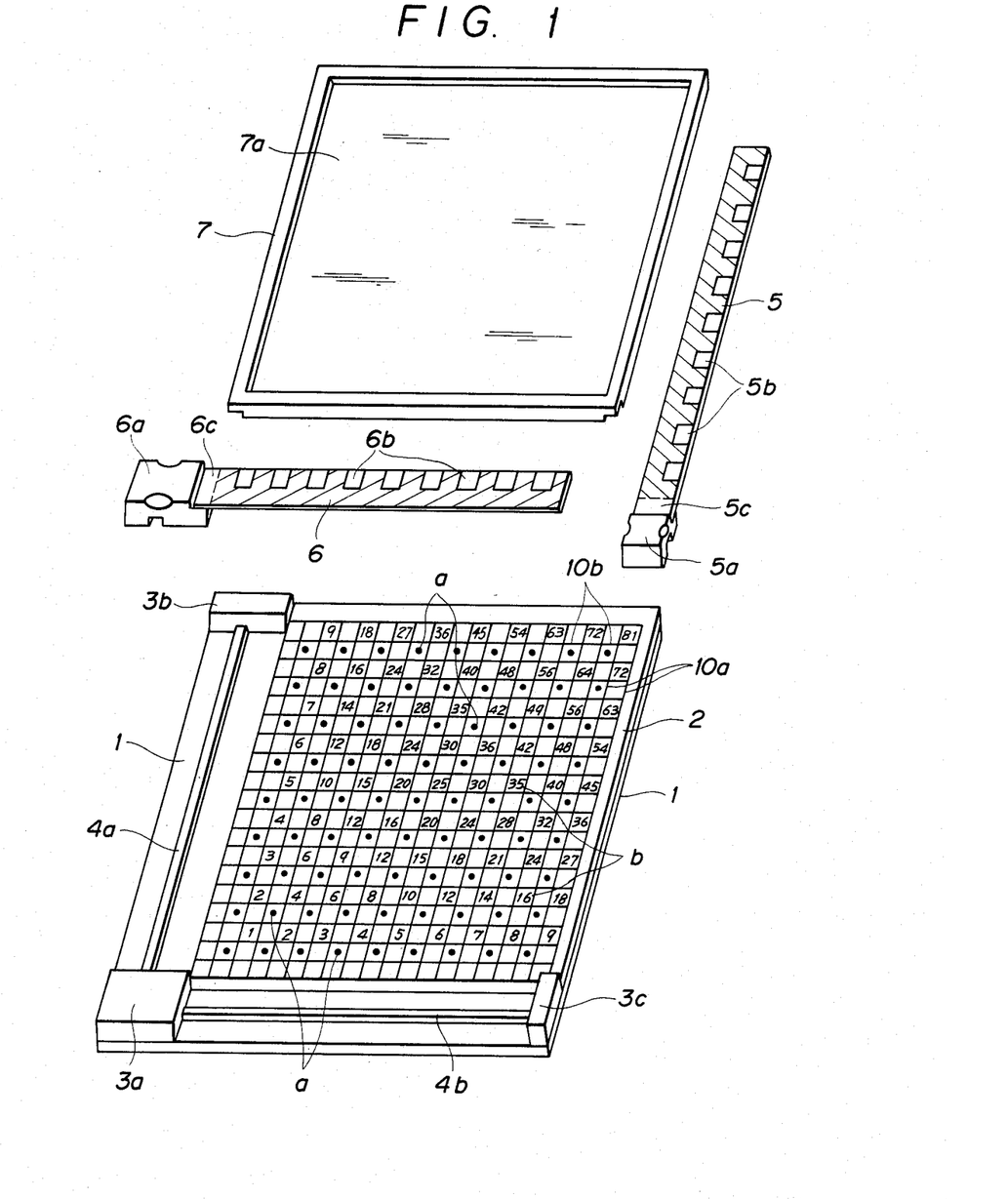
FIG. 1 shows a perspective view of main elements of an instrument for practicing multiplication concerning an embodiment of this invention.

A perferred embodiment of the invention is shown in FIG. 1 to FIG. 5. FIG. 1 shows main elements of the instrument. A square base plate 1 is attached a printed square plate 2 on the upper right surface of the base plate 1. A main stopper 3a is fixed on the lower left corner of the base plate 1 and other two stoppers 3b, 3c are fixed on the upper left corner and the lower right corner of the base plate 1. A guide rail 4a is attached on the base plate 1 terminated by stoppers 3a, 3b, and another guide rail 4b is attached on the base plate 1 terminated by stoppers 3a, 3c.

Said printed square plate 2 is divided into 19(9*2+1) rows of spaces by vertical lines 10a and horizontal lines 10b forming 361 small squares on it. The left end row of space and the low end row of space are blank space provided to support cursors explained later.

Each square in the even row counted from the blank space is printed with a dot mark (a) on it, and each square in the odd row is printed with a figure (number) (b) on it. By counting the number of row (X) from the left, and the number of row (Y) from the bottom, a specified figure (b) on a specified square is calculated by:

$$b=[(X-1)/2]*[(Y-1)/2]$$

For example, the square 3rd from left and 3rd from bottom, figure (b) is calculated, $$b=[(3-1)/2]*[(3-1)/2]=1$$

and a figure 1 is printed on the square.
When X=11, Y=9, $$b=[(11-1)/2]*[(9-1)/2]=20$$

a figure 20 is printed on that square.

A cursor 5 is provided a strip element of untransparent material which has its width to cover two rows of the squares, and transparent windows 5b are opened on the right half side of the strip element. A low end portion 5c of the strip element is fixed on a slide 5a which is slidably installed on said horizontal guide rail 4b.

Nine windows 5b are opened on the strip member, with each window corresponding to show a square in even row on the printed plate 2. These windows might be appertures instead of transparent windows.

Another cursor 6 is provided a strip element which covers two rows of squares having transparent windows on the upper half side of the strip element, and a left end 6c of the strip member is fixed on a slide 6a which is slidably installed on said vertical guide rail 4a.

Nine windows 6b are opened on the strip member, with each window corresponding to show a square in the even row on the printed plate 2. These windows might be appertures instead of transparent windows.

Figure 2:
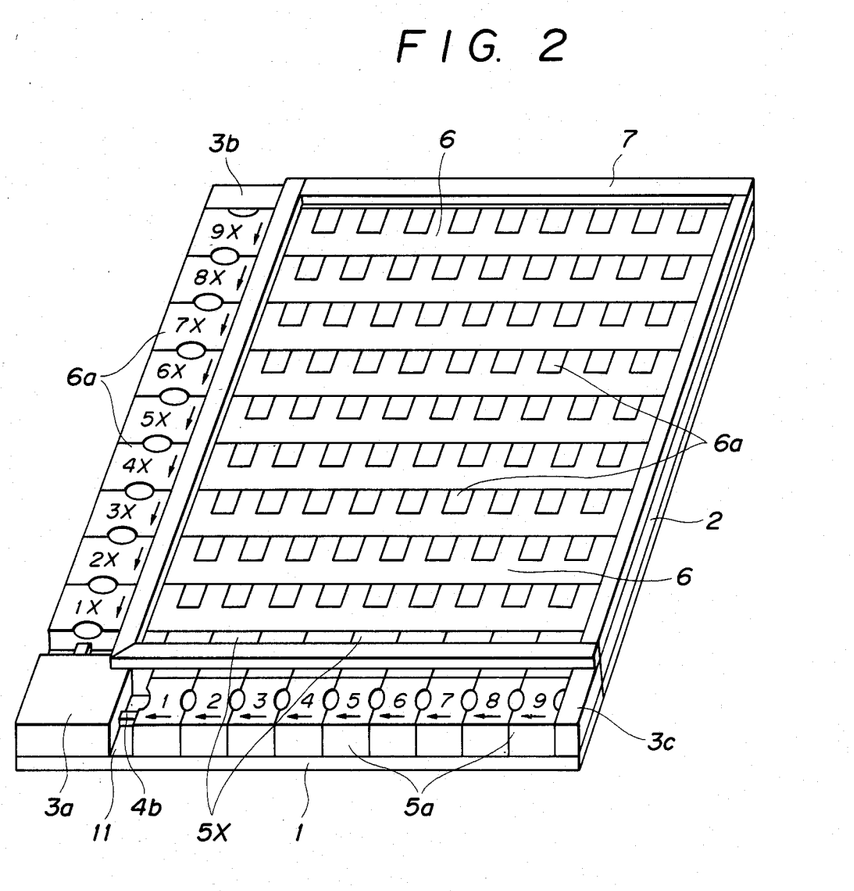
FIG. 2 is a perspective view of the instrument is assembled condition.

FIG. 2 shows how to assemble the instrument. At first, nine vertical cursors 5 are installed on the guide rail 4b. Then, on top of vertical cursors 5, nine horizontal cursors 6 are installed on the guide rail 4a. Finally, a cover 7 with glass plate 7a is covered on top of the instrument.

Horizontal cursors 6 might be installed on top of the vertical cursors 5.

As shown in FIG. 2, on top of each slide 5a of the vertical cursor 5, a sequence of numbers 1 to 9 and an arrow are printed, and all of the cursors 5 are pushed to right hand side stopper 3c, leaving a gap 11 corresponding one row of the squares on the plate 2 between the stopper 3a and the very left cursor 5. Horizontal cursor 6 also has a sequence of numbers 1 to 9 and an arrow on its slide 6a, and pushed to the top stopper 3b.

Figure 3:
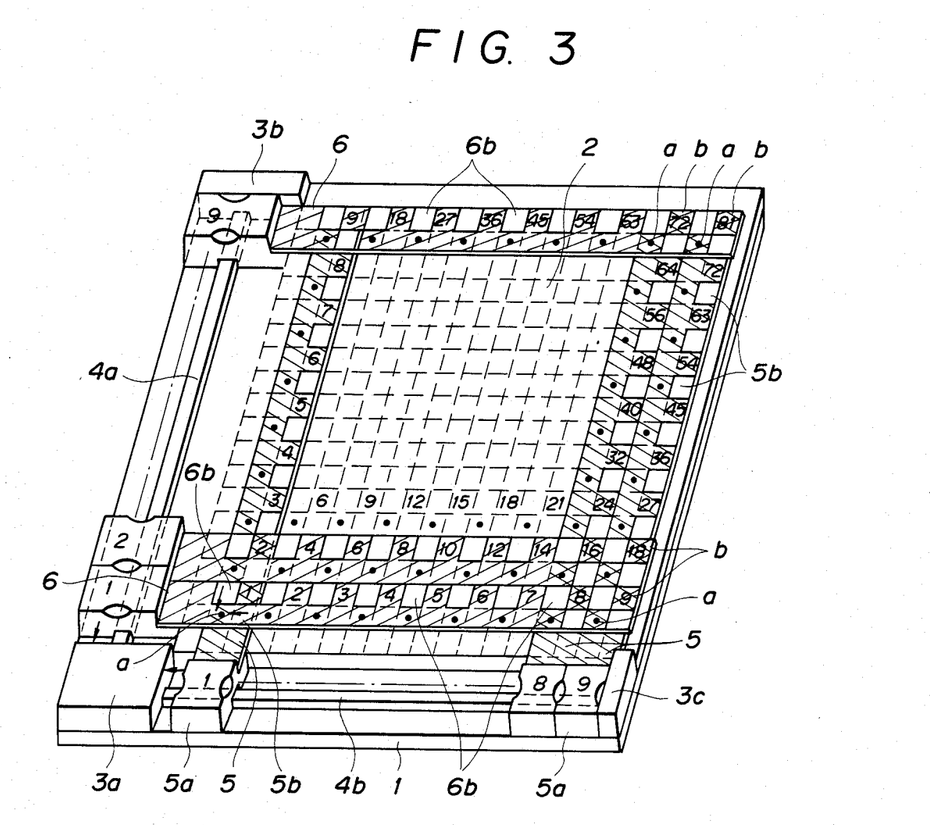
FIG. 3 is a perspective view of the instrument showing a part of the main elements.

FIG. 3 shows a part of the cursors 5, 6, and the printed plate 2 intended to explain the mechanism of the embodiment. In this condition, all the dots and figures on the printed plate 2 are covered in double by the untransparent portion of the cursor 5, 6, so no dot mark on the figure appears by sliding one of the cursors 5 or cursors 6 only.

Figure 4A:
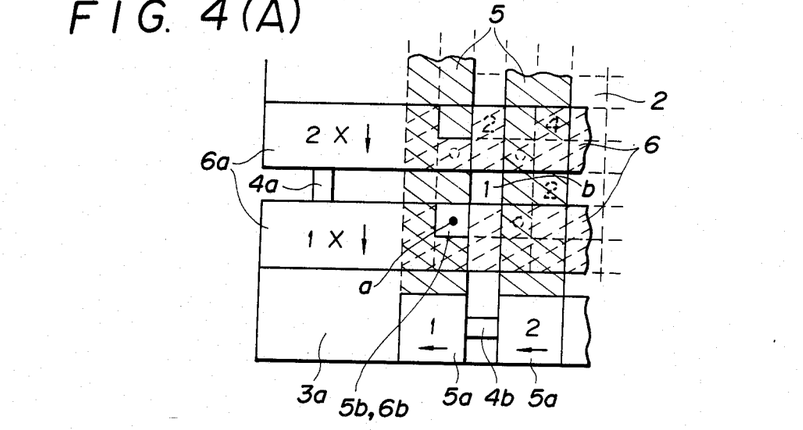
FIG. 4A and FIG. 4B show the operation of the instrument.

As shown in FIG. 4(A), when a cursor 5 of number 1 and a cursor 6 of number 1 are pushed to the stopper 3a, windows 5b, 6b of the cursors 5, 6 are put on one above another, showing a dot mark in the window. At the same time, FIG. 1 printed on the plate 2 appears in the gap surrounded by the cursors.

Figure 4B:
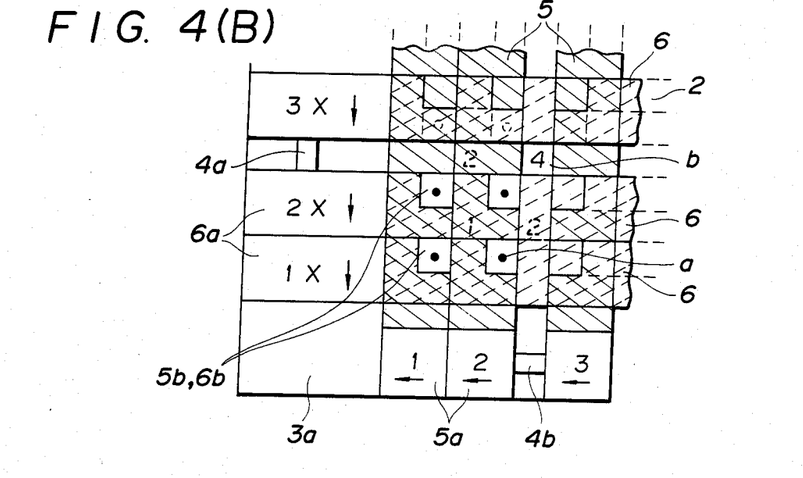

This shows, $$1*1=1$$

is calculated and displayed on the instrument. When the number 2 cursor 5 and the number 2 cursor 6 are pushed to the stopper 3a as shown in FIG. 4B, a FIG. 4 appears in the gap surrounded by the cursors and four dots are seen through the windows 5b, 6b.

It means 2*2=4 is calculated.

Figure 5:
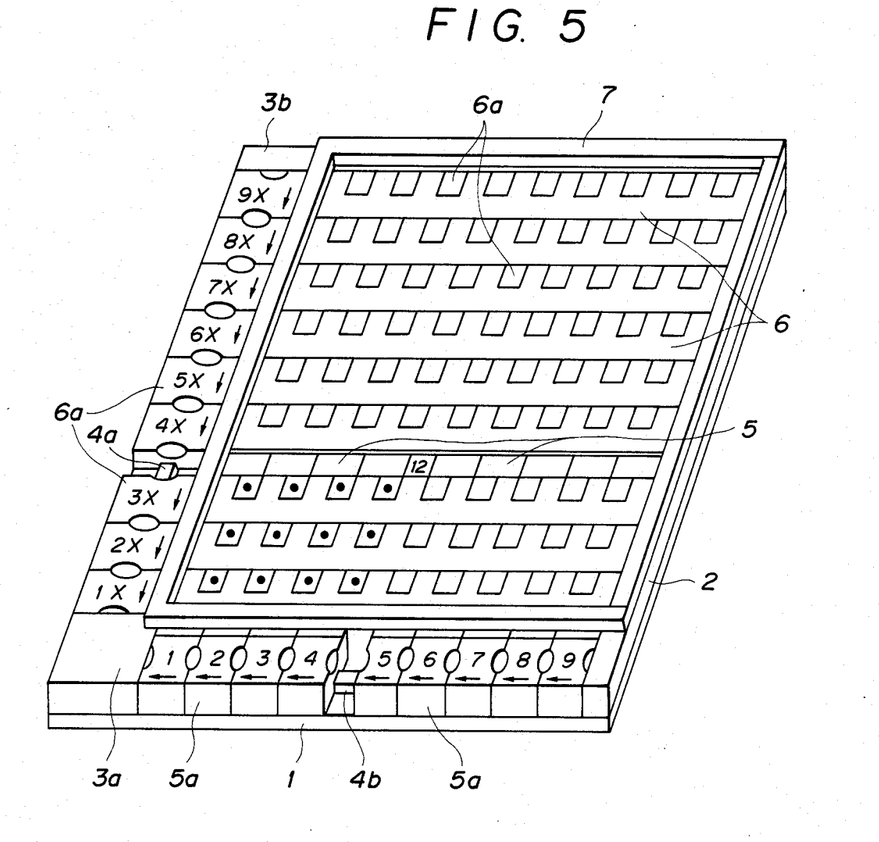
FIG. 5 shows another operation of the instrument.

FIG. 5 shows 3*4=12 is calculated, making twelve dots and a FIG. 12 appears on the instrument.

According to the embodiment, both a figure and dots equal to the figure are shown as the answer of multiplication, and children can learn and practice the multiplication system while understanding the value of the number at the same time.

Another embodiment of the invention is shown in FIG. 6 to FIG. 10. In these figures, same components to the above mentioned embodiment are given the same figures and are omitted the detailed explanation.

Figure 6:
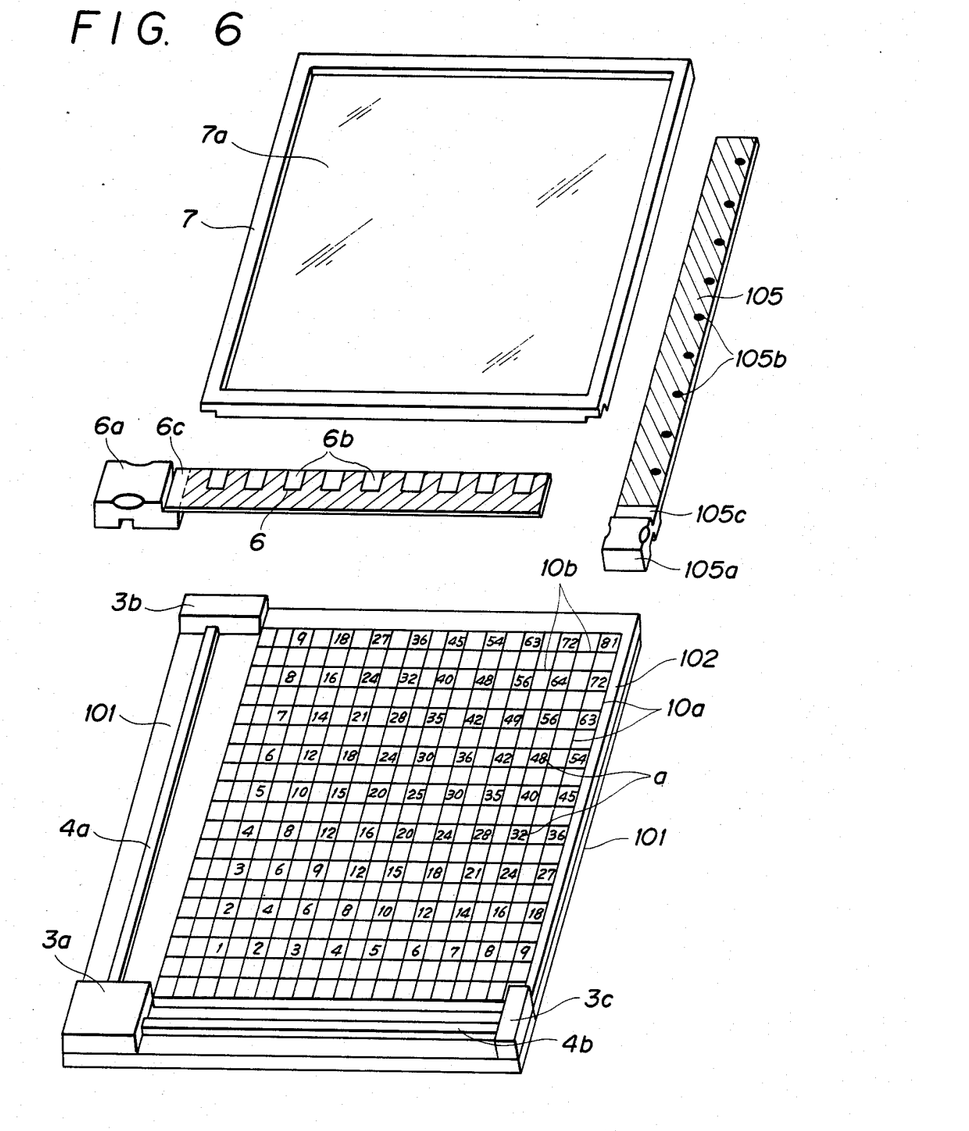
FIG. 6 shows a perspective view of main elements of an instrument concerning another embodiment of the invention.

FIG. 6 shows main elements of the embodiment which is comprised of a square base plate 101 on which is attached a printed plate 102. The printed plate 102 is divided into 19(9*2+1) even spaces by vertical lines 10a and horizontal lines 10b forming 361 small squares on it. The left end row of space and the low end row of space are blank space provided to support cursors. Each square in odd row counted from the blank space is printed a number (a) on it. By counting number of row (X) from left and number of row (Y) from bottom, a specified FIG. (a) on a specified square is culculated by:

$$a=[(X-1)/2]*[(Y-1)/2]$$

for example, the square 3rd from left and 3rd from bottom, FIG. (a) is calculated, $$a=[(3-1)/2]*[(3-1)/2]=1$$

and a figure 1 is printed on the square. When X=11, Y=9

$$a=[(11-1)/2]*[(9-1)/2]=20$$

a figure 20 is printed on that square.

Figure 7:
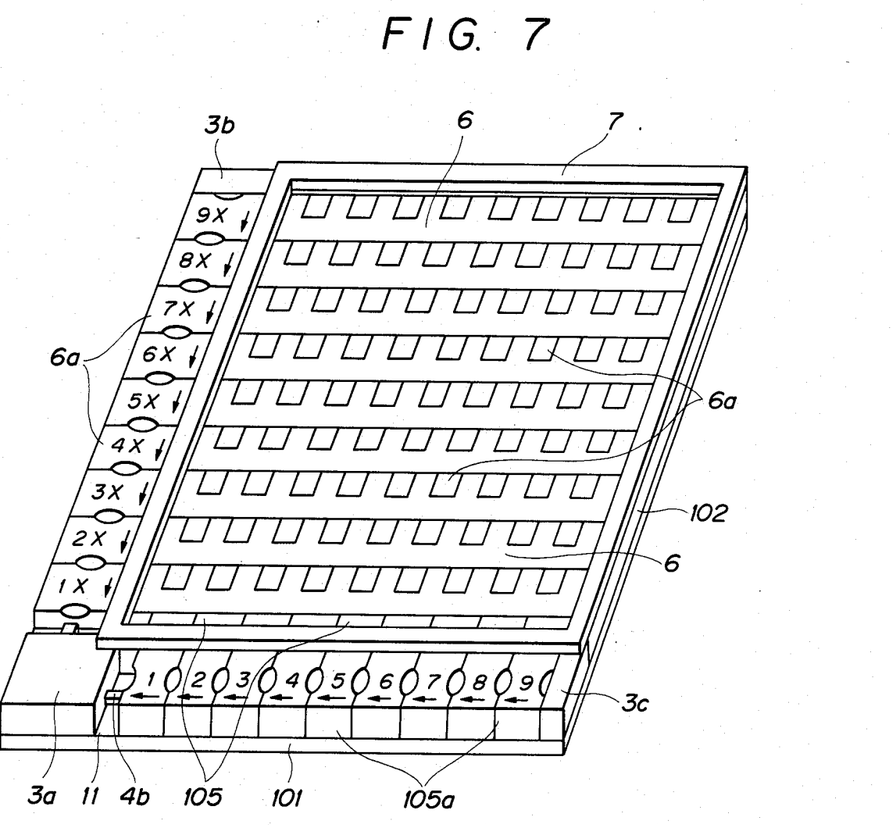
FIG. 7 is a perspective view of the instrument in assembled condition.

A cursor 105 is provided a strip element which has its width to cover two rows of the squares, and dot marks 105b are printed on the right half side of the strip element. A low end portion 105c of the strip element is fixed on a slide 105a which is slidably installed on a horizontal guide rail 4b. Each dot mark 105b printed on the strip is positioned to cover a square in even row on the plate 102. Another cursor 6 and a cover 7 used in this embodiment are the same elements explained in the first embodiment. FIG. 7 shows how to assemble the instrument.

At first, nine vertical cursors 105 are installed on the guide rail 4b. Then, on top of vertical cursors 105, nine horizontal cursors 6 are installed on the guide rail 4a. Finally, a cover 7 with glass plate 7a is covered on the top of the instrument.

As shown in FIG. 7, on top of each slide 105a of the vertical cursor 105, a sequence of numbers 1 to 9 and an arrow are printed, and all of the cursors 105 are pushed to right hand side stopper 3c leaving a gap 11 corresponding one row of the squares on the plate 102 between the stopper 3a and the very left cursor 105. Horizontal cursor 6 also has a sequence numbers 1 to 9 and an arrow on its slide 6a, and pushed to the stopper 3b.

Figure 8:
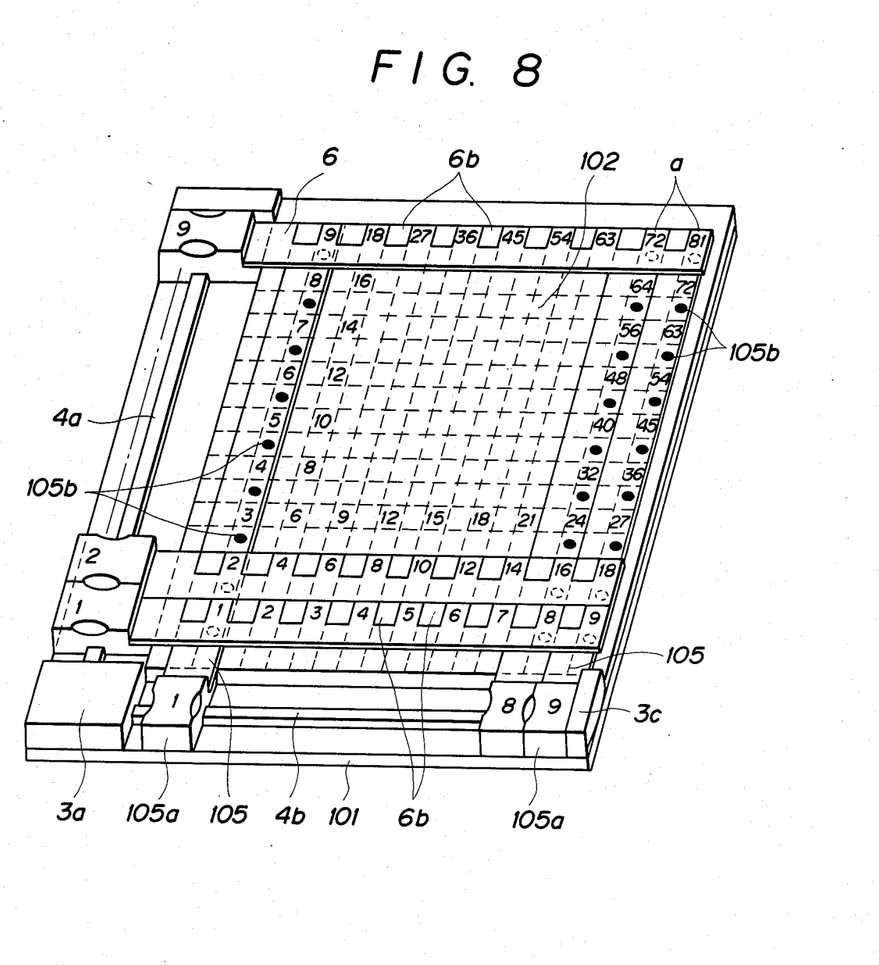
FIG. 8 is a perspective view of the instrument showing a part of the main elements.

FIG. 8 shows a part of the cursors 105, 6, and the printed plate 102, intended to explain the mechanism of the embodiment. In this condition, all the figures printed on the plate 2 are covered in double by the untransparent portion of the cursors 105 and the cursors 6, and all the dot marks printed on the cursors 105 are covered by the untransparent portion of the cursors 6, so no dot mark or number appears on surface.

Figure 9A:
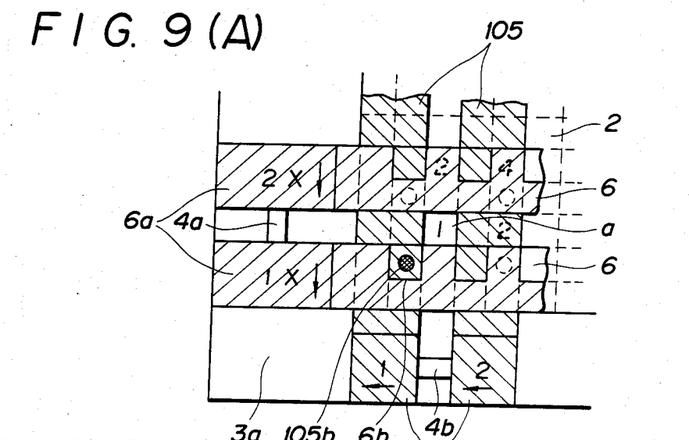
FIG. 9A and FIG. 9B show the operation of the instrument.

As shown in FIG. 9A, when a cursor 105 of number 1 and a cursor 6 of number 1 are pushed to the stopper 3a, a window 6b of the cursor 6 is put on a dot mark 105b of the cursor 105, and the dot mark 105 appears through the window 6b. At the same time a figure 1 printed on the plate 102 appears in the gap surrounded by the cursors.

Figure 9B:
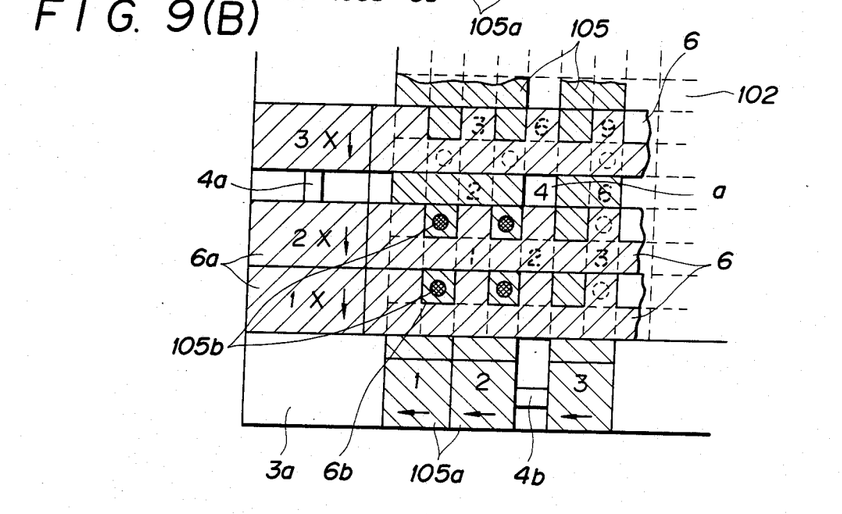

When the number 2 cursor 105 and the number 2 cursor 6 are pushed to the stopper 3a as shown in FIG. 9B, a figure 4 appears in the gap surrounded by the cursors, and four dots are seen through the window 6b. It means 2*2=4 is calculated.

Figure 10:
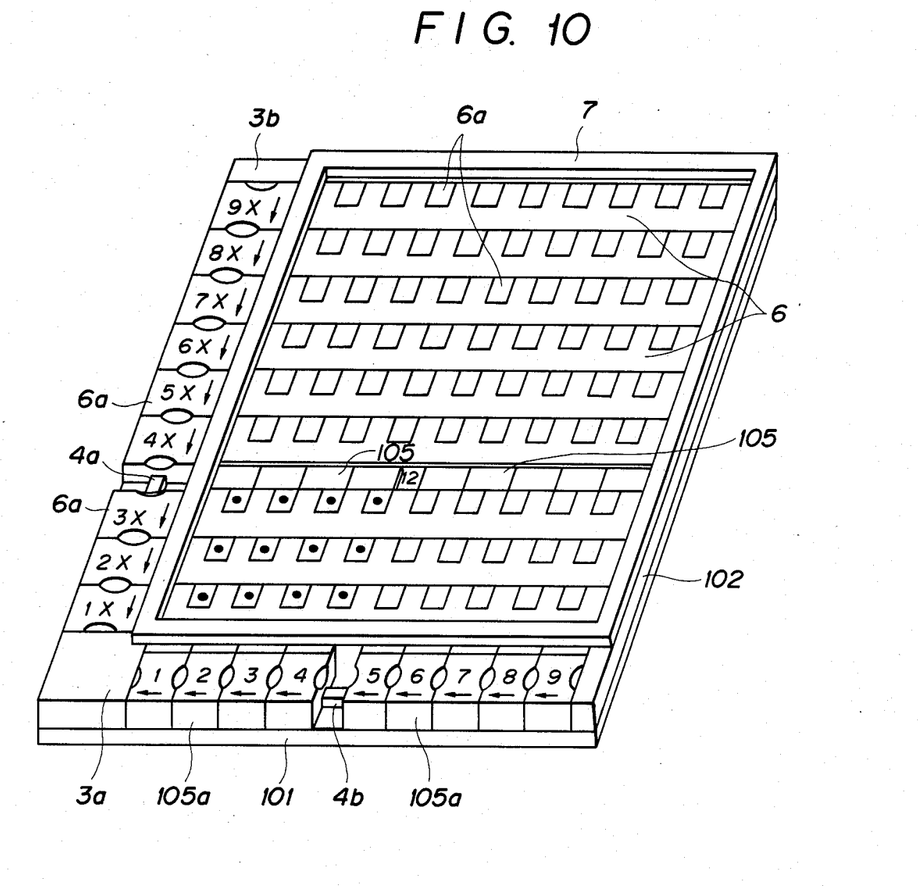
FIG. 10 shows another operation of the instrument.

FIG. 10 shows 3*4=12 is calculated, making twelve dots and a figure 12 appeared on the instrument.

As explained in the above two embodiments, using this instrument children enjoy calculation multiplication by sliding cursors in many ways. This instrument helps children to understand the logic of the multiplication by showing the number and the value of the number at the same time.

I claim:

1. An instrument for practicing multiplication comprising a base plate, a square printed plate on the base plate and on which are printed vertical and horizontal rows of marks and figures, the rows of marks being interposed between the rows of figures, a set of elongate vertical cursors each provided with a vertical row of windows, the cursors being slidably installed side-by-side on said base plate and covering all but one of said vertical rows or marks and figures on the printed plate, a set of elongate horizontal cursors each provided with a horizontal row of windows, the horizontal cursols being slidably installed side-by-side on the base plate and covering all but one of said horizontal rows of marks and figures on the printed plate, the cursors being arranged for sliding a selected number (X) of said vertical cursors and a selected number (Y) of said horizontal cursors to a position toward one corner of the printed plate, and the windows, marks, and figures being mutually disposed whereby in said position of the cursors, a multiplication of the selected numbers X and Y is calculated, a figure representing the answer of the multiplication is displayed between respective cursors, and marks equal in number to the answer are displayed in aligned windows of the cursors.

2. An instrument as claimed in claim 1 wherein the cursors each have an elongate body portion formed with the windows and a pushing handle at one end of the body portion, wherein the handles are mounted on respective elongate slides on the base plate and wherein the body portions of the cursors are covered by a cover plate.

3. An instrument as claimed in claim 1 wherein the printed plate is divided into 19 equally spaced parallel lines defining 361 squares and wherein the figures and marks are provided on alternate squares.

4. An instrument for practicing multiplication comprising a base plate, a square printed plate on the base plate and on which are printed vertical and horizontal rows of figures interspersed with rows of blanks, a set of elongate vertical cursors slidably installed side-by-side on the base plate and covering all but one of said vertical rows of figures and blanks, a set of elongate horizontal cursors slidably installed side-by-side on the base plate and covering all but one of said horizontal rows of figures and blanks, the cursors in one of said sets being disposed under the cursors of another of said sets, the cursors in said one set each being provided with a lengthwise row or marks, the cursors in said another set each being provided with a lengthwise row of windows, the cursors being arranged for sliding a selected number (X) of said one set and a selected number (Y) of said another set to a position toward one corner of the printed plate, and the windows, marks, and figures being mutually disposed whereby in said position of the cursors, a multiplication of the selected numbers X and Y is calculated, a figure representing the answer of the multiplication is displayed between respective cursors, and marks on said one set of cursors, equal in number to the answer are displayed in aligned windows of the other set of cursors.

5. An instrument as claimed in claim 4 wherein the cursors each have an elongate body portion formed with the windows and a pushing handle at one end of the body portion, wherein the handles are mounted on respective elongate slides on the base plate and wherein the body portions of the cursors are covered by a cover plate.

6. An instrument as claimed in claim 4 wherein the printed plate is divided into 19 equally spaced parallel lines defining 361 squares and wherein the figures and marks are provided on alternate squares.

* * * * *

UNITED STATES PATENT AND TRADEMARK OFFICE
CERTIFICATE OF CORRECTION

PATENT NO. : 4,790,757

DATED : December 13, 1988

INVENTOR(S) : Fumitaka Takahashi

It is certified that error appears in the above-identified patent and that said Letters Patent is hereby corrected as shown below:

On The Title Page, Item [30] should read

-- [30]  Foreign Application Priority Data

November 19, 1986  [JP]  Japan ..................... 61-274153
  October  28, 1986  [JP]  Japan ..................... 61-254770 --.

Signed and Sealed this

Twenty-fifth Day of April, 1989

*Attest:*

DONALD J. QUIGG

*Attesting Officer*  *Commissioner of Patents and Trademarks*